Feb. 13, 1973   R. L. COHEN   3,716,715
THICKNESS MEASUREMENTS USING THE MOSSBAUER EFFECT
Filed Dec. 4, 1970   2 Sheets-Sheet 1

INVENTOR
R. L. COHEN
BY
ATTORNEY

United States Patent Office 3,716,715
Patented Feb. 13, 1973

3,716,715
THICKNESS MEASUREMENTS USING THE MOSSBAUER EFFECT
Richard Lewis Cohen, Berkeley Heights, N.J., assignor to Bell Telephone Laboratories, Incorporated, Murray Hill and Berkeley Heights, N.J.
Filed Dec. 4, 1970, Ser. No. 95,126
Int. Cl. G01t 1/16
U.S. Cl. 250—83.30                                    5 Claims

ABSTRACT OF THE DISCLOSURE

Resonant gamma ray absorption techniques (Mössbauer effect) are used to monitor the thickness of foils or deposited layers containing tin, iron and a number of other elements. The measurements are non-destructive and largely independent of environmental factors such as surface residues (e.g., chemical salts or dirt) and surrounding fluids (e.g., lubricants or plating baths).

BACKGROUND OF THE INVENTION (1) Field of the invention

The thickness of foils or deposited layers is measured during or after processing.

(2) Description of the prior art

Low energy gamma rays emitted by radioactive forms of a number of elements are resonantly absorbed by atomic nuclei of the same element contained in soliid bodies. This physical phenomenon is known as the Mössbauer effect. This phenomenon has been used by many investigators to study a number of physical properties of solids. This phenomenon is useful because the emitted gamma rays have a very narrow energy line width so that measurements of previously unattainably high resolution can be made. Physical effects, such as magnetic interactions and chemical bonding, cause small shifts in the gamma ray absorption energy spectrum of the absorber. In order to measure these small shifts they are compensated for by causing the gamma ray source to move relative to the absorber thus imparting a Doppler shift to the energy of the gamma ray.

The thickness measuring art has been continually plagued by the problems of the measurement of thin layers on thicker support members and the measurement of deposited layers in situ during the deposition process. In many situations the accuracy of the former measurements is limited by nonuniformities and imperfections of the support member while the latter measurements have proven to be difficult to perform at all by primary measurements. Deposited layers are usually controlled during deposition by secondary measurements (e.g., plating current and plating time) or by the removal of the work piece from the deposition apparatus at intermediate stages and direct thickness measurement.

SUMMARY OF THE INVENTION

Procedures involving the resonant absorption of low energy gamma rays (Mössbauer effect) are adapted here, to great advantage, for use in the routine production thickness measurement of thin deposited layers or foils which include tin, iron, and a number of other elements. The apparatus which is required to perform these measurements is simple, rugged and inexpensive, consisting primarily of the gamma ray source, a gamma ray detector (solid state detectors are available), and signal processing apparatus (e.g., counters, signal comparison devices, differencing circuits, etc.) which can be as simple or as complex as the usage warrants. The measurements are non-destructive and are largely independent of the measuring environment. This environmental independence allows such operations as the measurement of foils in the presence of support rollers, surface dirt or lubricants, the measurement of platings within the plating bath, or the measurements of sputtered or evaporated layers within the sputtering or evaporation chamber. The relatively weak sources of low energy gamma rays which are required present no extraordinary radiation hazard.

DETAILED DESCRIPTION OF THE INVENTION

Mössbauer Effect

Figure 1:
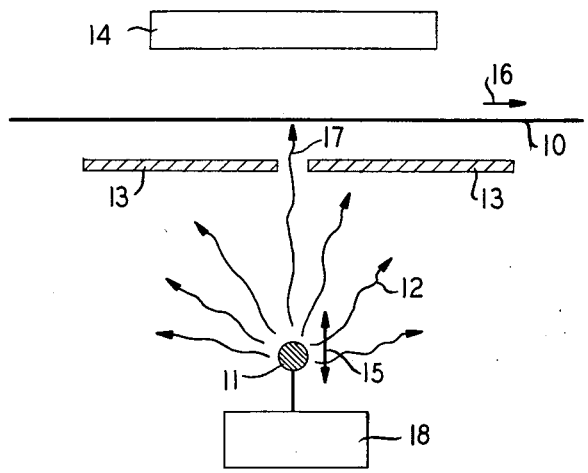
FIG. 1 is a schematic view of an exemplary thickness measurement apparatus.

FIG. 1 illustrates a simple apparatus for thickness measurement using the resonant absorption of gamma rays generally within the energy range $2 \times 10^3$ electron volts to $200 \times 10^3$ electron volts (Mössbauer effect). Here the layer to be measured 10 contains an element (referred to herein as the subject element) capable of exhibiting resonant absorption. The source 11 of gamma rays 12 contains a radioactive form of the same subject element. The gamma rays 12 are collimated by the shield 13, passed through the layer 10 to be measured, and are incident on a detector 14. The attenuation of the gamma ray beam as it passes through the layer is dependent upon the thickness of the layer. Gamma ray sources in the range 1 mCi. to 10,000 mCi. (millicuries) are useful for the measurement of layers less than 1000 microns in thickness. Sources of lower strength will produce insensitivity of measurement or inordinately long measurement time while sources of greater strength will produce radiation hazards necessitating cumbersome shielding. Layers more than 1000 microns thick require inordinately strong sources.

The various mathematical relationships which govern the resonant absorption are well known and can be found in such reference texts as "Mössbauer Effect: Principles and Applications," by G. K. Wertheim, Academic Press, 1964. The various relationships will only be treated qualitatively here. The principle which governs the Mössbauer effect is as follows: Gamma rays which are emitted by atomic nuclei situated in a solid body will be resonantly absorbed by similar nuclei in a second solid body if (a) the two solids are crystallographically similar and at rest with respect to one another or (b) if the two bodies are crystallographically different and are moving with respect to one another at a suitable velocity. In situation (b) the relative motion causes a Doppler shift calculated to compensate for any chemical shifts caused by differences in the crystalline environment of the absorbing and emitting atoms.

In addition to the abovementioned compensation, motion of the source 11, as indicated by the arrows 15, can be used to increase the sensitivity of the thickness measurement. If, during a portion of the measuring time, the source is given a velocity which does not allow resonant absorption, a base detection level is established which is dependent primarily upon gamma ray absorption in any substrate, support member or environmental fluid which may be present. If, during another portion of the measurement time, resonant absorption is permitted, any difference in detection level is only proportional to the thickness of the layer being measured which contains the subject element also contained in the gamma source 11.

The particular elements capable of exhibiting the Mössbauer effect are well nown in the art. Among the most commercially important species which exhibit the effect most strongly are tin, iron, gold, tantalum, europium and iridium. Of these, tin and iron are the easiest to work with in the neighborhood of room temperature. Reference to the particular properties of these elements and other elements which exhibit this effect can be found in such places as "Chemical Applications of Mössbauer Spectroscopy" by Goldanskii and Herber, Academic Press, N.Y. 1968, and "Messung der rückstofffreien Resonaz-Absorption am 6,2 Ke V-Niveau in $^{181}Ta$" by Sauer, Zeitschrift für Physik 222 (1969), page 439.

Methods for the production of suitable gamma ray sources are, likewise, well known in the art. They involve, for example, the exposure of suitable substances to the neutron flux within a nuclear reactor and the separation of the by-products of nuclear fission. For instance (in connection with the examples to be presented below), if a $Sn^{118}$ nucleus absorbs a neutron, a $Sn^{119}$ nucleus will be produced in a metastable state which will decay with a half life of 250 days with the emission of a gamma ray. This gamma ray can be resonantly absorbed in the absorber by another $Sn^{119}$ nucleus. Also, one of the commercially available products of uranium fission is $Sm^{151}$ which is beta active with a half life of 90 years. The $Sm^{151}$ nucleus will emit an electron, thus producing a $Eu^{151}$ nucleus in an excited state. The $Eu^{151}$ nucleus will shortly thereafter emit a gamma ray which can be resonantly absorbed by another $Eu^{151}$ nucleus in the absorber. The radioactive form of the subject elements are thus produced within suitable solid bodies and form the gamma ray sources used in the disclosed measurement.

Exemplary Uses

FIG. 1 shows the inventive process as applied to the measurement of the thickness of a planar layer. The layer may be an independent layer such as a metal foil upon a support member or a layer which has been deposited on a substrate. The layer may be stationary during the measurement or it may be moving in a direction 16 generally perpendicular to the direction of the impinging gamma rays 17. It must be remembered, however, that any component of motion parallel to the direction of the incident gamma rays 17 affects the resonant absorption via the Doppler effect. Constructive use of such a motion component can be made to compensate for chemical shifts referred to above. In FIG. 1 means is provided 18 to generate motion 15 of the source 11 which can also be used to compensate for chemical shifts or to enable measurements to be made of the layer thickness independent of the thickness of the substrate as described above. The incident gamma rays 17 are collimated by the shield 13 in order to limit the component of the motion of the layer parallel to the direction of the incident gamma rays.

Figure 2:
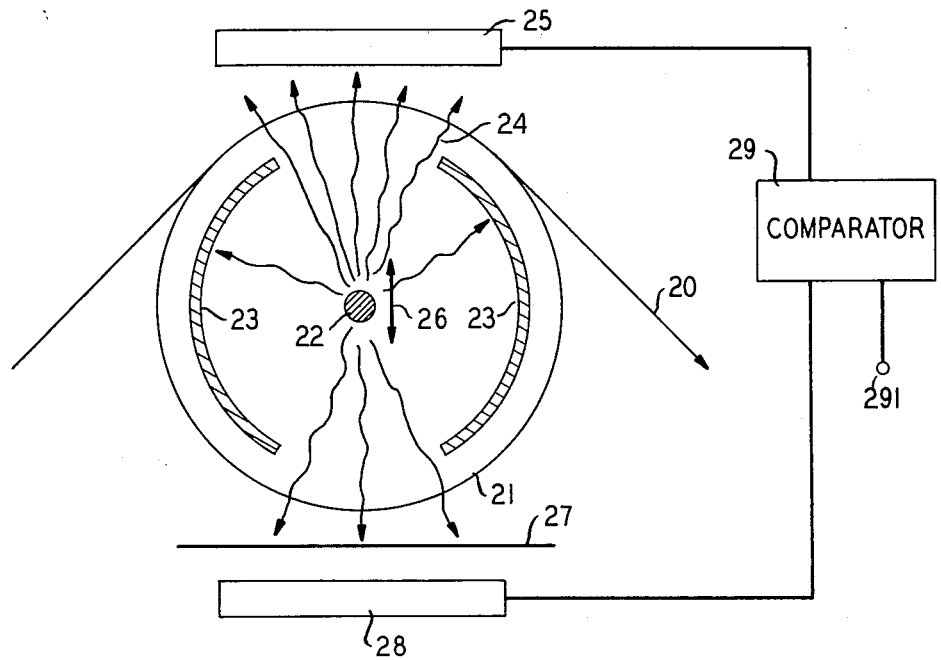
FIG. 2 is a schematic view of an exemplary thickness measurement apparatus illustrating the use of a roller.

FIG. 2 shows a foil 20 passing over a cylindrical roller 21. Here the gamma ray source 22 is located axially within the roller 21. This geometry allows a much larger opening in the shield 23 while still maintaining the motion of the layer at all times perpendicular to the direction of the impinging gamma ray 24. The utilized fraction of the gamma ray emission is, thus, increased permitting more rapid measurements to be made or the use of weaker sources 22. The gamma rays which pass through the layer are detected by the detector 25. Once again the source 22 can be provided with a motion component 26 in order to accomplish any of the results described above.

FIG. 2 also shows how the apparatus can be arranged to compare the foil 20 being measured with a standard foil 27. Here gamma rays being emitted from the source 22 pass through the standard foil 27 and are detected by the detector 28 producing a companion signal. The output signals from the two detectors 25, 28 are compared in the comparator 29 in order to monitor deviations of the foil 20 thickness from that thickness desired. This process of continuous calibration makes the measurements independent of source strength variation. Alternatively, the apparatus can be precalibrated by using a number of foils 27 and recording the corresponding outputs of the detector 28.

Figure 3:
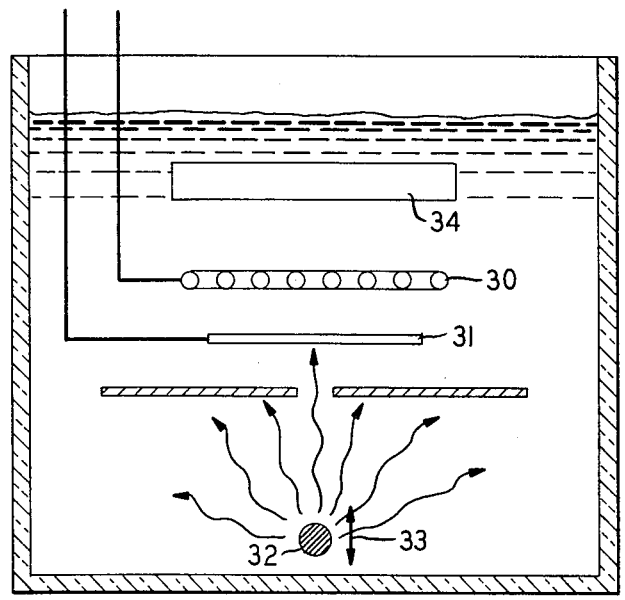
FIG. 3 is a schematic view of an exemplary thickness measuring apparatus illustrating the measurement within a plating bath.

FIG. 3 shows measurements being made by the inventive process within a plating bath. This is possible because resonant absorption only occurs within a solid body. Atomic nuclei of the same species within the liquid will not resonantly absorb low energy gamma rays. Due to this fact the thickness measurements can even be made during the plating process and serve as a monitor of layer thickness. Here the plating current is being passed between an anode grid 30 and the substrate being plated 31 while gamma rays are emitted from a source 32, which may be moving in a direction indicated by the arrows 33, passing through the substrate 31 being plated. The gamma rays are detected by the detector 34.

The output of the detector 34 can be compared with previously or subsequently collected data taken using layers of known thickness or can be used in a comparison scheme as illustrated in FIG. 2. In such case the output 291 of the comparator 29 can be used to control the plating current by varying its magnitude and by stopping the plating process when the layer reaches a desired thickness. The same kind of control can be realized in a sputtering apparatus or any other type of deposition apparatus. A control scheme of this type can also be realized using previously collected data to form the comparison signal.

Figure 4:
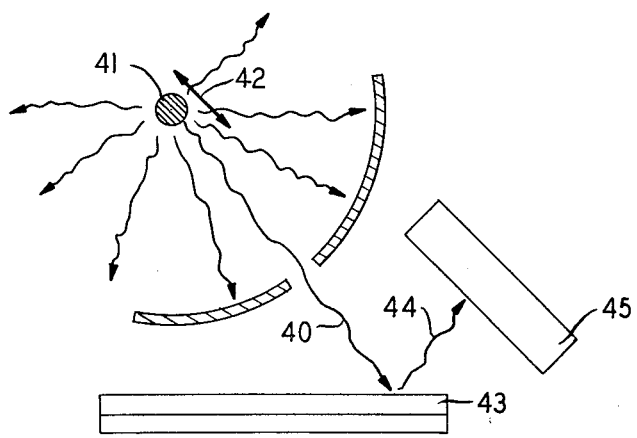
FIG. 4 is a schematic view of an exemplary thickness measuring apparatus illustrating the reflection mode of measurement.

FIG. 4 illustrates the fact that the measuring process need not be a transmission process. The measurements can also be made in a reflection-type mode. This mode is useful if, for instance, the substrate is thick or indeed a layer is being deposited completely around a body, such as a thin layer being deposited on the surface of a wire. Gamma rays 40 being emitted by source 41, which may be moving in the direction indicated by the arrows 42, impinge upon the layer to be measured 43. A portion of them, due to the same resonant interaction which causes the resonant absorption described above, will be scattered back to the same side of the film 44 and can be intercepted by a detector 45. Just as in the absorption process, the intensity of the gamma radiation so scattered is related to the thickness of the layer being measured 43.

EXAMPLES

In one exemplary use of this technique, a radioactive $Sm_2O_3$ source with a strength of 50 milicuries (50 mCi.) was used to measure the thickness of a 125 $\mu$m. thick layer of europium-iron-gallium garnet deposited on a non-europium containing garnet substrate. As explained above, the $Sm_2O_3$ source emits $Eu^{151}$ gamma rays which are resonantly absorbed by the europium in the layer. Since the europium nuclei are in an oxide crystal environment in both the source and the absorbing layer, there is no significant relative chemical shift. Resonant absorption is, thus, observed with the source and layer at rest relative to one another. With no relative motion a count rate of 1500 per second was observed as opposed to a rate of 1575 per second with the source moving relative to the absorber. These measurements are sufficient to determine the film thickness to within ±10 $\mu$m. in a measurement time of 1.6 minutes moving by comparison with similar measurements made through an absorbing layer whose thickness is known.

In another measurement, which required a relative velocity in order to compensate for a chemical shift, a $BaSnO_3$ source of $Sn^{119}$ gamma rays was used to measure the thickness of a 62 μm. thick layer of tin telluride. The source had a strength of 1 mCi. A count rate of 5,400 per second was observed with the source moving toward the absorbing layer at a rate of 3 mm. per second (the resonant condition). Off resonance the count rate was 5,600 per second. This is sufficient to measure the film thickness to within ±5 μm. in a measuring time of 1.6 minutes by comparison with similar measurements made through an absorbing layer whose thickness is known.

In measurements such as those above, the use of more intense gamma sources will result in shorter measuring time and/or increased accuracy. The measuring time (for the same accuracy) varies as the reciprocal of the source strength and the accuracy (for the same measuring time) varies as the reciprocal of the square root of the source strength. Source strengths can be increased far above those used in the above examples before inordinate radiation precautions will have to be taken. For purposes of comparison, medical X-ray machines emit equivalent to the order of $10^4$ Ci. which is many orders of magnitude stronger than any sources envisioned here.

What is claimed is:

1. A method for measuring the thickness of a layer of solid matter comprising a subject element characterized in that the method comprises:
   (a) irradiating the layer for an irradiation period with gamma rays the photon energy of which lies in the range of $2 \times 10^3$ electron volts to $200 \times 10^3$ electron volts and which have been produced by a radioactive form of the subject element, the gamma rays resonantly interacting with the subject element in the layer for at least a portion of the irradiation period;
   (b) detecting at least a portion of the gamma rays which emerge from the layer, with a detector, the detector being capable of producing an output signal dependent upon the quantity of the gamma rays which emerge from the layer thus producing an output signal which is dependent upon the thickness of the layer;
   (c) comparing the output signal with a comparison signal derived from the irradiation of a standard layer of known thickness and detection of the gamma rays emerging from the standard layer; and
   (d) comparing the output signal and the comparison signal in a comparator, the comparator producing a control signal dependent upon the relationship between the thickness of the layer and the thickness of the standard layer, the control signal being used to control the formation of the layer, and the measuring being performed within a deposition chamber while the layer is being formed by a deposition process.

2. A method of claim 1 in which the chamber is a plating bath and the measuring is performed while the layer is being formed by a plating process.

3. A method for measuring the thickness of a layer of solid matter comprising a subject element characterized in that the method comprises:
   (a) irradiating the layer for an irradiation period with gamma rays the photon energy of which lies in the range of $2 \times 10^3$ electron volts to $200 \times 10^3$ electron volts and which have been produced by a radioactive form of the subject element, the gamma rays resonantly interacting with the subject element in the layer for only a portion of the irradiation period;
   (b) detecting at least a portion of the gamma rays which emerge from the layer, with a detector, the detector being capable of producing an output signal dependent upon the quantity of the gamma rays which emerge from the layer thus producing an output signal which is dependent upon the thickness of the layer;
   (c) subtractively processing the output signal produced during the portion of the irradiation period in which the gamma rays are caused to resonantly interact with the subject element and the output signal produced during the remainder of the irradiation period so that a net output signal is produced which is less sensitively influenced by interactions other than resonant interactions; and
   (d) comparing the net output signal with information relating to the net output signal to thickness resulting in a measurement of the thickness of the layer of solid matter.

4. A method of claim 3 in which the measuring is performed within a deposition chamber while the layer is being formed by a deposition process.

5. A method of claim 4 in which the chamber is a plating bath and the measuring is performed while the layer is being formed by a plating process.

References Cited

UNITED STATES PATENTS

| | | | |
|---|---|---|---|
| 3,193,683 | 7/1965 | Reiffel | 250—106 S |
| 3,497,691 | 2/1970 | Chen | 250—83.3 D |

JAMES W. LAWRENCE, Primary Examiner

D. L. WILLIS, Assistant Examiner